May 30, 1944.  I. F. KINNARD  2,350,170
VOLT AMPERE METER
Filed Oct. 15, 1941
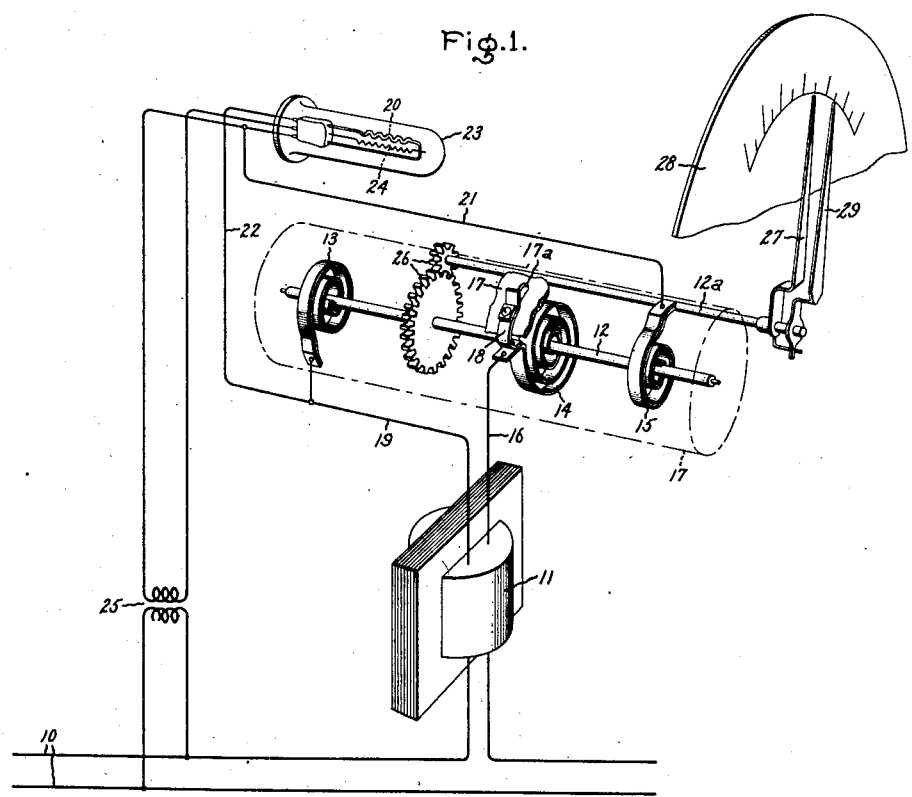
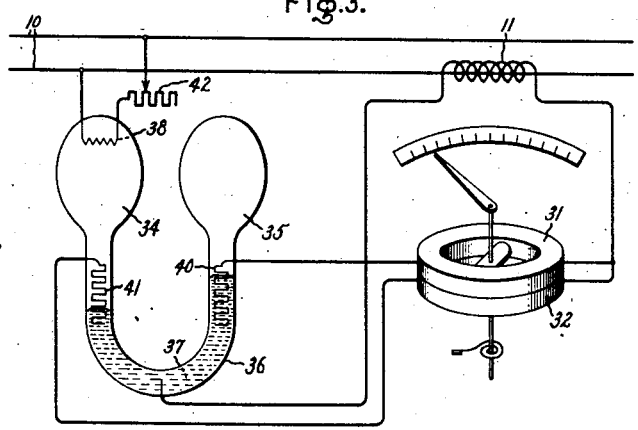
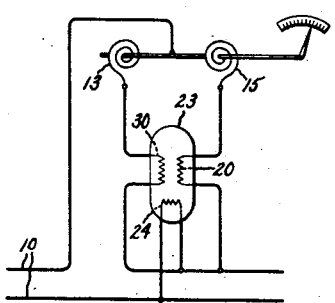
Inventor:
Isaac F. Kinnard,
by Harry C. Dunham
His Attorney.

Patented May 30, 1944

2,350,170

UNITED STATES PATENT OFFICE 2,350,170

VOLT-AMPERE METER

Isaac F. Kinnard, Boston, Mass., assignor to General Electric Company, a corporation of New York Application October 15, 1941, Serial No. 415,059

8 Claims. (Cl. 171—95)

My invention relates to the measurement of volt amperes and in particular it relates to a thermal volt ampere demand meter. In carrying my invention into effect, I provide differential measuring instruments such as a meter having two torques which oppose each other. These torques are produced in response to the flow of the load current of the circuit, the volt amperes of which are to be metered, and the ratio of the two torques is varied in such a way in response to changes in voltage of the circuit to be metered that the resultant torque is proportional to volt amperes. In a preferred arrangement the load current is caused to flow in parallel torque producing meter circuits, one circuit producing a relatively large positive torque and the other a relatively small negative torque, the two torques operating upon the same measuring element so that it responds to the difference in the torques. The circuit supplying the negative torque contains a regulator controlled by the voltage which reduces the relative amount of current flowing in such negative torque producing circuit as the voltage increases by an amount which causes the differential torque to be substantially proportional to volt amperes.

The features of my invention which are believed to be novel and patentable will be pointed out in the claims appended hereto. For a better understanding of my invention reference is made in the following description to the accompanying drawing in which Fig. 1 represents an embodiment of my invention employing thermal torque producing elements, with a voltage responsive regulator in the negative torque producing circuit. Fig. 2 represents a schematic modification where the voltage responsive regulator operates differentially on both the negative and positive torque producing circuits. Fig. 3 represents an indicating volt ampere meter embodying my invention.

Referring now to Fig. 1, 10 represents a power line which may be either D. C. or A. C. but since the problem of measuring volt amperes is bothersome only in connection with alternating current circuits, my invention is not limited to, but is intended to be used for, measuring the volt amperes of alternating current circuits. 11 represents a current transformer for obtaining a current proportional to the load current of power line 10. The current transformer energizes reverse torque elements of a thermal type of meter which elements are supplied from the secondary of transformer 11 in parallel. The thermal meter comprises a shaft 12 of conducting material to which is fastened the inner ends of three spirals 13, 14 and 15. The central spiral 14 is not of bimetal and produces no torque changes on shaft 12 by reason of changes in temperature. It serves with shaft 12 as a common current connection to the inner ends of spirals 13 and 15 and is thus connected to one side of the secondary of the current transformer by lead 16. Also, the outer end of spiral 14 may be adjustable for the purposes of adjusting the zero setting of the meter. Shown in dotted line outline is a shell 17 encasing the meter and the clip 18 is intended to secure the outer end of spiral 14 to a slot 17a in the shell 17 in order that the outer end of spiral 14 may be secured in a fixed but adjustable position about shaft 12. Spirals 13 and 15 are of bimetal, the inner side of which has a temperature coefficient of expansion greater than the outer side so that when these spirals are heated they tend to uncoil. Their outer ends are suitably secured so as to remain stationary, for example to the shell 17, and hence expansion and contraction of spirals 13 and 15 produce torques tending to rotate shaft 12. These thermal responsive spirals are coiled about the shaft in opposite directions and hence produce reverse torques on shaft 12. Thus spiral 13 tends to rotate shaft 12 counterclockwise when heated and spiral 15 tends to rotate shaft 12 clockwise when heated. These thermal responsive spirals are heated by current flow therethrough and thus comprise their own heaters, although separate heaters might be used if desired. The outer ends of spirals 13 and 15 are connected to the other lead 19 of the secondary of current transformer 11, spiral 13 directly and spiral 15 through a resistance 20 and wires 21 and 22.

It is thus seen that the spirals 13 and 15 are connected in parallel to the secondary of transformer 11, the connection of spiral 13 being through lead 16, shaft 12 and lead 19 and the connection of spiral 15 being through lead 16, shaft 12, wire 21, resistance 20, wire 22, and lead 19. Generally the greater amount of current passes through spiral 13 and it produces the greater torque. A variable amount of the total line current is shunted about spiral 13 through what may be termed the reverse torque spiral 15 and resistance 20. In order to vary the current through spiral 15 and hence the ratio of currents through the thermal responsive spirals 13 and 15 the resistance 20 is varied by a regulator here represented as of a thermal type. In this case the regulator comprises an enclosing tube 23, either evacuated or gas filled, containing the resistance 20 and a heater resistance 24 which is connected across the secondary of a potential transformer 25 supplied from the voltage of line 10. Suitable leading-in wires are provided for the tube 23 as shown. It is now seen that heater 24 is energized in proportion to the voltage of line 10. Resistance 20 is made of a material having a positive temperature coefficient of resistance and hence its resistance increases with rise in voltage of line 10. I have found that it is satisfactory to make the shunt resistance 20 of iron wire and preferably operate it between temperatures of 100 to 500 degrees C. in the tube which reduces heat losses and prevents oxidation of the resistance 20 and heater 24.

Other materials having high temperature coefficients of resistance may also be used for the resistance 20. It is desirable, however, to employ a material which has a large temperature coefficient of resistance and a temperature coefficient which is either substantially constant or increases with temperature over the temperature range at which it will operate, taking into consideration not only changes in voltage but also changes in ambient temperature. For example, nickel might be used up to about 400° C. If the operating temperature goes above 1000° C. a tungsten resistor could be used.

It is seen that I have provided a metering device operated by the load current and jointly controlled by the load current and the voltage of the line 10. Two torques are produced, a torque T in one direction produced by spiral 13 and a smaller torque t in the opposite direction produced by spiral 15. The resultant torque T—t causes rotation of shaft 12 and it is possible by the arrangement described to produce a resultant torque and deflection substantially proportional to volt amperes. The regulation is independent of variations in the power factor or the phase relation betweeen the load and voltage currents.

The rotary movement of shaft 12 which occurs in response to the differential torque of spirals 13 and 15 is conveyed to a shaft 12a through deflection multiplying gears 26 and moves a pointer 27 over a volt ampere scale 28. A friction pointer 29 may also be provided which is pushed up-scale by pointer 27 to remain at the highest point of deflection to indicate the maximum volt ampere demand.

Assume now that for a given line current and normal voltage a given pointer deflection is produced by reason of the fact that the torque of spiral 13 exceeds that of a spiral 15. If, now, the voltage increases, the resistance 20 in the reverse torque branch of the circuit is increased. Hence more current will flow through spiral 13 and less through spiral 15, resulting in an increased deflection. If the voltage decreases below normal, resistance 20 will operate at a lower than normal temperature and its resistance will be less than normal. Hence the torque of spiral 15 will increase relative to the torque of spiral 13 and a decreased deflection will result. Theoretically the torques of spirals 13 and 15 should be equal when there is no heating of resistor 20 by heater 24 corresponding to a zero voltage condition. Actually such a condition will not arise in practice and it is generally sufficient to have the voltage regulator perform its function over a voltage range from 10% above to 10% below normal voltage. Heating of resistance 20 by reason of the current flow therethrough should be negligible as compared to heating produced by the voltage heater 24. It is possible thus to arrange matters to obtain a measurement approximately proportional to volt amperes over the useful measurement range.

In a practicable meter it has been found that, under normal operating conditions, that is full load current and normal voltage, the resistance of spirals 13, 15 and resistor 20 may be in the relation of .05, .05 and .035 ohm with resistor 20 operating at a considerably higher temperature than spirals 13 and 15. The invention, however, is not confined to this resistance relationship or to the values specified. The particular type of thermal meter represented is of the type described in detail in a copending application of Edward E. Lynch and Herbert C. Thomas, Serial No. 398,602, filed June 18, 1941, and assigned to the same assignee as the present invention.

In Fig. 2 I have schematically represented a modification which may be the same as that of Fig. 1 with the following exception. The positive torque spiral 13 also has in series with it a temperature sensitive resistance 30. This resistor 30 is contained within the tube 23 heated by the voltage heater 24. However, resistor 30 has a negative temperature coefficient of resistance instead of a positive temperature coefficient of resistance. In such an arrangement the resistor 30 differentially assists resistor 20 in the regulation in response to voltage to shift current from negative torque spiral 15 to positive torque spiral 13 in response to a rise in voltage. The resistances and resistance changes will be so chosen as to obtain a resultant response proportional to volt amperes.

In Fig. 3 I have shown a further modification of my invention which has very little thermal and time lag between a circuit changing condition and the measurement response. In Fig. 3, 10 represents the A. C. line being metered and 11 the current transformer which supplies coils 31 and 32 of an iron vane ammeter in parallel circuits. Coils 31 and 32 are connected in opposition and coil 31 predominates to produce the differential operating flux. The regulator is in the form of a closed vessel which may be made of glass. It has two gas expansion chambers 34 and 35 connected by a U tube 36 containing a quantity of mercury 37. Expansion chamber 34 contains a filament like resistance 38 which is heated in response to the voltage of line 10. Expansion chamber 35 has no heater and hence as the voltage increases and the gas in chamber 34 expands relative to that in chamber 35, the mercury level in the two risers of the U tube will shift accordingly.

Such shift in mercury level is used to differentially control resistances 40 and 41 contained in the circuits of coils 31 and 32 respectively. Hence, when the voltage increases, resistance 41 is increased and resistance 40 is decreased, and accordingly current in coil 31 increases at the expense of a decrease in current in coil 32. As a result, the differential or operating flux of the meter varies in proportion to the line voltage changes as well as line current and by suitably selecting the resistance and adjusting the voltage current in the heater circuit by an adjustable resistance 42 the meter deflection may be made proportional to volt-amperes over the useful measurement range.

Any suitable form of differential A. C. ammeter, including the thermal meter previously described, may be used. Since the two chambers 34 and 35 are substantially equally influenced by ambient temperature changes the regulator tends to be self-compensated for ambient temperature variations, as is also true of the other modifications.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for measuring the product of the volt and ampere quantities of an electric power line comprising a differential electrical measuring instrument having a pair of energizing circuits and responsive to the difference of the flow of current in said energizing circuits, means for energizing said circuits in parallel by in-phase alternating currents, the total of which is proportional to one of said quantities, and a regulator responsive to the other of said quantities for varying the relative flow of such currents in the parallel energizing circuits independently of variations in the phase relation between the volt and ampere quantities such that the response of the differential instrument is substantially proportional to the volt amperes of the line to be metered.

2. A volt ampere meter comprising a differential electrical indicating instrument having a pair of energizing circuits and responsive to the difference in the flow of current in said circuits, means for energizing both of said circuits by in-phase alternating currents, the sum of which is proportional to the current of the circuit the volt amperes of which are to be measured, and a regulator responsive to the voltage of the circuit to be metered for varying the relative flow of such currents in said circuits independently of variations in the phase relation between the current and voltage of the circuit to be metered such that the indicating response of said instrument is substantially proportional to the volt amperes of the circuit to be metered.

3. Apparatus for obtaining a measurement proportional to volt amperes of an alternating current circuit comprising a measuring instrument having two energizing circuits and influenced in response to the differential flow of in-phase alternating current in such energizing circuits, connections for causing a current the total of which is proportional to the current of the circuit to be metered to divide and flow in parallel in said energizing circuits, and a regulator in at least one of said parallel circuits controlled in response to the voltage of the circuit to be metered independently of variations in the phase relation between the current and voltage of the metered circuit for varying the relative magnitude of such currents flowing in the two parallel circuits such that the differential response of said instrument is substantially proportional to the volt ampere of the circuit to be metered.

4. Apparatus for measuring the volt amperes of an electric circuit comprising a measuring instrument having two energizing circuits and responsive to the difference of the flow of in-phase alternating current in said energizing circuits, connections for causing a current, the total of which is proportional to the current of the circuit to be metered, to divide and flow in parallel in said energizing circuits and a regulator controlled in response to the voltage of the circuit to be metered for inversely regulating the flow of such current in the parallel energizing circuits independently of variations in the phase relation of the current and voltage of the circuit to be metered to the extent necessary to cause the differential response of said instrument to be substantially proportional to volt amperes.

5. Apparatus for measuring the volt amperes of an alternating current circuit comprising a differential electrical measuring instrument having two energizing circuits and responsive to the differential flow of current in said energizing circuits, connections for causing an alternating current, the total of which is proportional to the current of the circuit to be metered, to divide and flow in parallel in said energizing circuits, a regulator comprising means for varying the relative resistances of said two parallel energizing circuits and a thermal means energized in response to the voltage of the circuit to be metered for controlling said regulator to cause the differential response of said instrument to be substantially proportional to volt amperes.

6. Apparatus for measuring the volt amperes of an alternating current circuit comprising a differential electrical measuring instrument having a movable indicator and two thermal torque producing devices acting, when heated, in opposition on said movable indicator, electric heater circuits for the thermal torque producing devices, connections for causing said heater circuits to be energized in parallel by currents the total of which is proportional to the current of the circuit to be metered, a resistance having a positive temperature coefficient of resistance in one of said parallel circuits and a heater for said resistance energized in proportion to the voltage of the circuit to be metered.

7. Apparatus for measuring the volt amperes of an alternating current circuit comprising a differential electrical measuring instrument having a movable indicator and two thermal torque producing devices which, when heated, act in opposition on said movable indicator, electric heater circuits for said thermal torque producing devices, connections for causing said heater circuits to be energized in parallel by currents the total of which is proportional to the current in the circuit to be metered, a resistance having a positive temperature coefficient of resistance in one of said parallel circuits, a resistance having a negative temperature coefficient of resistance in the other parallel circuit, and a heater for said resistances energized in proportion to the voltage of the circuit to be metered.

8. Apparatus for measuring the volt amperes of an alternating current circuit comprising a differential electrical measuring instrument having a movable armature member and two coils connected in opposition to produce a differential flux for actuating said armature member, connections for energizing said two coils in parallel by currents the total of which is proportional to the current of the circuit to be metered, regulating resistances contained in both coil circuits and means for inversely varying said resistances in response to variations in voltage of the circuit to be metered.

ISAAC F. KINNARD.